Aug. 28, 1956  A. G. DEAN ET AL  2,760,725
THERMAL CONDITIONING AND VENTILATING MEANS AND METHOD
Filed Oct. 24, 1951  8 Sheets-Sheet 2

INVENTORS
Albert G. Dean
Lewis F. Reynolds
Edwin M. Callender.
BY Maurice A. Crews
ATTORNEY

INVENTORS.
Albert G. Dean
Lewis F. Reynolds
Edwin M. Callender
BY
Maurice A. Crews
ATTORNEY Aug. 28, 1956  A. G. DEAN ET AL  2,760,725
THERMAL CONDITIONING AND VENTILATING MEANS AND METHOD
Filed Oct. 24, 1951  8 Sheets-Sheet 5

INVENTORS.
Albert G. Dean
BY Lewis F. Reynolds
Edwin M. Callender

Maurice A. Crews
ATTORNEY

United States Patent Office 2,760,725
Patented Aug. 28, 1956

2,760,725

THERMAL CONDITIONING AND VENTILATING MEANS AND METHOD

Albert G. Dean, Narberth, Lewis F. Reynolds, Philadelphia, and Edwin M. Callender, Cynwyd, Pa., assignors to The Budd Company, Philadelphia, Pa., a corporation of Pennsylvania Application October 24, 1951, Serial No. 252,928

15 Claims. (Cl. 237—5)

This invention relates to thermal conditioning and ventilating means and method, particularly suited for vehicles, and more especially for railway passenger cars, and has for an object the provision of improvements in this art.

This application is a continuation-in-part of applicants' copending application Serial No. 204,254, filed January 3, 1951, now abandoned.

One of the objects of the invention is to provide thermal conditioning and ventilating means and method which provide maximum reliability and minimum maintenance, achieved through simplification of controls and reduction in the number of component parts and through the use of known and reliable elements.

Another object is to assure, for a compartment vehicle, comfort for varying passenger demand by providing simple, effective and rapidly acting controls for the several compartments.

Another object is to provide a basic thermal supply which is automatically controlled to furnish an over-all comfort temperature at any outside temperature.

Another object is to provide temperature controls having rapid response for varying the inside temperature of each space or compartment up or down relative to the over-all comfort temperature range or zone established by the basic thermal supply means.

Among the specific objects of the invention are the following:

To provide a thermal conditioning system which will provide a stable comfort temperature condition throughout the length of the enclosure or car over any expected outside temperature range regardless of thermal exchange within the enclosure from any other source, as for example the ventilating means.

To provide a basic thermal exchange condition over an extensive space and for an extensive time whereby to meet the special thermal exchange requirements at different compartments at a relatively low temperature difference with respect to the basic temperature maintained in the enclosure.

To provide in each compartment of a multi-compartment enclosure, such as a room-type sleeping car, means which enables the occupant of each compartment to vary the temperature to suit his personal preference, either raising or lowering the temperature.

To provide a thermal conditioning and ventilating system and method of operation thereof wherein fresh air is supplied continuously and at a temperature within a general comfort range within which the basic thermal exchange means operates but at an initial air temperature sufficiently below that maintained by the basic thermal exchange means to provide a selective lowered comfort temperature for those who prefer it.

To provide a thermal exchange system in which sidewall heat exchange means is alone sufficient to maintain an inside comfort temperature and compensate for all thermal exchange through the entire outer wall or shell of the enclosure and which will be fully adequate even during layover conditions when electrical power is not available.

To provide heat exchange means between primary heat exchange media, such as steam or refrigerant and water, extending the full length of the enclosure sidewalls and with forced circulation of the finally used heat exchange medium, such as water, whereby a substantially uniform temperature is maintained throughout the length of the sidewalls.

To provide a separate system of this nature for each sidewall to compensate for temperature differential between sides due to sun, wind and other influences.

To provide a thermal conditioning system having electrical booster heat for the ventilating air at each compartment; also a system in which the temperature of the main supply of air for the entire enclosure is increased during heating periods if the main supply of electric power decreases by a given amount.

To provide a system in which the electrical booster heaters are cut off if the voltage of the car source drops too low or if the main air blower fails.

The above and other objects and advantages of the system and method will be apparent from the following description of an exemplary embodiment thereof, reference being made to the accompanying drawings, wherein.

In order to better understand the need for the present invention it will be helpful to consider the best available systems which have heretofore been used. The system most widely used on railway coaches includes a plurality of steam heated pipes or boxes arranged along each side of the car, the supply of steam to each box or unit being controlled by a thermostat which is responsive to the temperature of the inside adjacent space. The system also includes an overhead air duct having the supply of air heated by steam and the steam supply controlled conjointly by the inside space temperature and the temperature of the air which is returned to the heater for recirculation.

For a compartment car there is a separate sidewall steam heating box for each compartment and a thermostat is provided for each compartment which can be set by the occupant at such temperature as he may select. The overhead air is supplied and its temperature controlled as for the coach but each compartment is provided with a damper to regulate manually the amount of air supplied to the compartment.

In another system which is in common use the arrangement is similar to that described above but the supply of heat for the overhead air is made partly responsive to the temperature of the outside air.

The systems referred to above have the fundamental defects that they create wide fluctuations in temperature, wide variations in temperature between different spaces within the enclosure, and erratic control generally. They are also costly because of the large amount of control equipment required. The systems for heating compartments are especially unsatisfactory because of the fact that there is a constant conflict between the effects produced by the damper control and the sidewall heat control which makes it impossible for the passenger to obtain a stable condition of heating and ventilation for his compartment. A basic difficulty which is inherent in the prior systems is that steam sidewall heating is not smooth in regard to time but overshoots and undershoots to such an extent that it is difficult to maintain a comfort condition. Another difficulty is that the overhead air is made the main source of heat and air does not have enough thermal inertia to be a suitable medium to produce constant comfort conditions; and this is especially true when its temperature as supplied to the enclosure is varied according to outside temperatures.

The present system overcomes these difficulties and has been found by extensive tests to provide stable comfort conditions by employing a full-length sidewall heating arrangement which uses a heating medium, such as a liquid, having very great thermal inertia to supply enough heat to take care of all shell heat losses at all temperatures, supplying overhead air at a set temperature which falls within or near the temperature range established by the sidewall heating means so as not to materially alter the basic temperature condition established by the sidewall heating means, and in the case of compartmented enclosures, by providing individual control of the volume of the constant-temperature air admitted or by providing separate thermal variation for the air entering each compartment, or control of both volume and thermal change.

The sidewall heat may be supplied by water pipes on each side running the full length of the car and heated by concentric steam pipes also running the full length of the car. The supply of steam for heating the water may be conjointly controlled by outside air temperature and the temperature of the water so that as the outside temperature drops the water temperature increases to supply all the shell heat losses. There is thus provided separately for each side of the car but for full length on each side, an over-riding temperature which is very constant both as to time and as to space along the length of the car. Therefore, nothing which the occupant of an individual compartment can possibly do within the range of the controls at his disposal for acting upon the air, a medium of small thermal inertia, can materially upset his basic comfort condition as imposed by the sidewall heating means over which he has no control; and especially, nothing he can do can materially affect the conditions established for other compartments and the car as a whole.

The new system, in addition to providing much more uniform and stable comfort conditions and selective controls which actually give the control desired, also requires far less instrumentation and equipment than prior systems and is therefore much less expensive and subject to trouble than prior systems.

Figure 1:
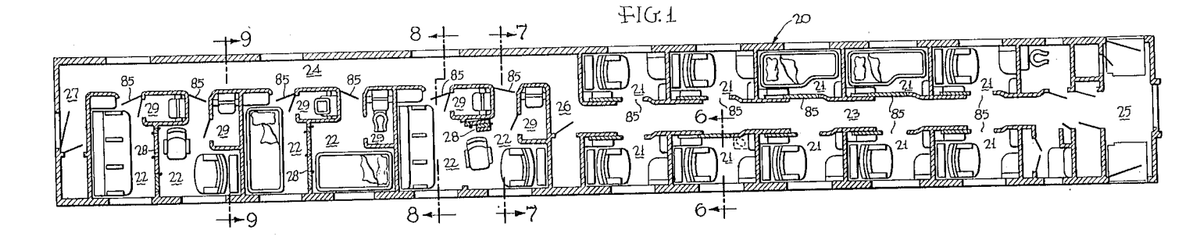
Fig. 1 is a plan view of a compartmented sleeping car to which the thermal conditioning and ventilating means and method are applied, the heat exchange means itself, however, being omitted from this view for the sake of clarity of illustration.
Figure 2:
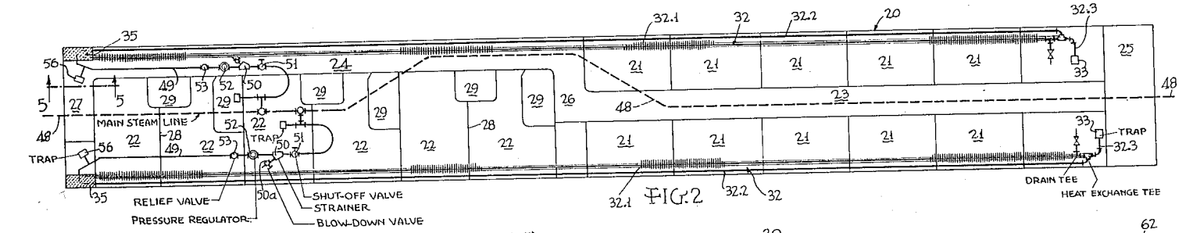
Fig. 2 is a floor plan similar in vertical location to Fig. 1 but with the furnishings removed and the sidewall heat exchange means shown.

Referring to the drawings (Figs. 1–3), a compartment type railway car 20 forms an over-all enclosure and interiorly comprises a plurality of smaller compartments, roomettes or cabins 21, a plurality of larger compartments or bedrooms 22, a center aisle 23 between the cabins, a side aisle 24 alongside the bedrooms, and an end vestibule 25. The aisles 23 and 24 are connected near the center of the car by a short transverse aisle 26, and at the end of the car opposite the end vestibule 25 there is an end aisle or small vestibule 27. The large compartments or bedrooms 22 are arranged in pairs with a foldable partition 28 between them, the partition when folded permitting two adjoining rooms to be used as a suite. Each bedroom has its own toilet 29 and other facilities so as to serve for separate independent occupancy when the partition 28 is closed between rooms.

The basic thermal exchange for the car is provided (Figs. 2, 4, 5, 6, 7 and 9) by through-running sidewall thermal-exchange means 32 which here is separate and independent for each side. This will accommodate for the differences in temperature at opposite sides due to the effects of sun, wind, and the like. Depending upon interior arrangement, the systems on opposite sides may run one from each end or both from one end, the latter being the form illustrated. Each sidewall heat exchange means includes a lower finned fluid pipe 32.1 for thermal-exchange liquid and an upper non-finned liquid pipe 32.2. Concentrically disposed within the finned liquid pipe 32.1 there is arranged a full-length thermal-exchange medium fluid supply pipe 32.3 extending completely through the liquid pipe from end to end to keep the liquid and medium fluids completely separate at all times. It is simpler to refer to heating alone, rather than comprehensively to heating and cooling by the sidewall thermal exchange means, hence the pipe 32.1 will be called the water pipe and the pipe 32.3 will be referred to as the steam pipe. One advantage of having fully separated fluids is to avoid diluting the water with steam condensate and thereby reducing the anti-freeze characteristics when it carries anti-freeze inclusions. Another reason for maintaining complete separation between fluids is to avoid erratic water circulation such as might occur by having live steam enter the water at certain times and only steam condensate at other times. The steam may all condense by the time it flows the full length of the car but to take care of all occasions when it does not condense a steam trap 33 is provided.

Liquid is circulated through the liquid system (Figs. 4 and 5) by a motor-driven pump 34, the liquid flowing from the pump to a tank or sump 35 by way of a pipe 36 and coming to the pump from the finned pipe 32.1 by way of a fitting 37 and a pipe 38. Liquid flows outward from the tank through the non-finned pipe 32.2 and enters the finned pipe 32.1 at its outer end. There is not much heat loss from the pipe 32.2 hence the liquid which entered the tank hot is still near its maximum temperature when it enters the outer end of pipe 32.1. For normal operation the pump runs continuously and heat application is intermittent hence the heating effect is practically uniform from end to end. The pump might be installed to cause water to flow in either direction. For layover, when the pump is not operating, the flow is in the direction indicated, namely the same as that shown for pump operation. Here if there should be a slight gradient, the ends will be hottest, and this is preferred.

Figure 4:
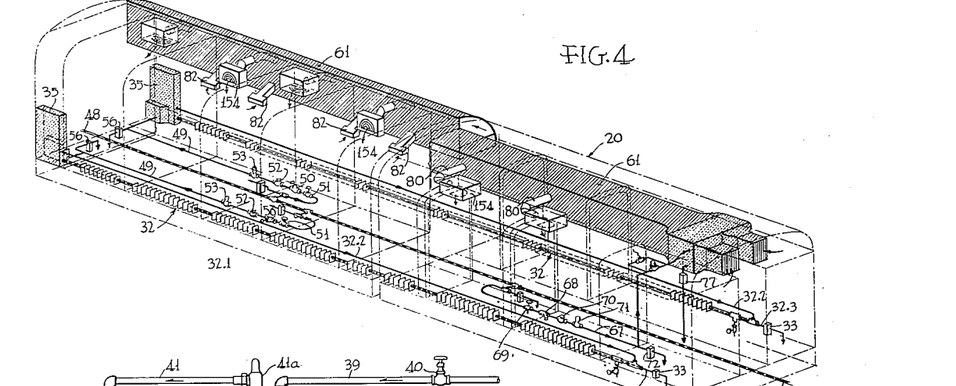
Fig. 4 is an isometric view showing the complete system of thermal exchange and ventilating means.
Figure 5:
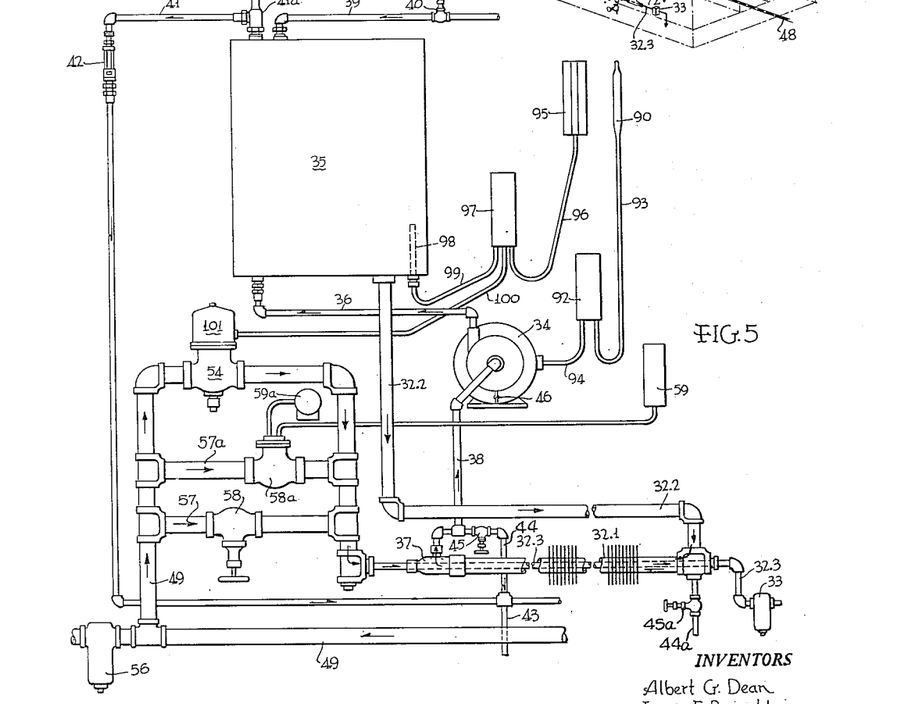
Fig. 5 is an enlarged vertical elevation of the sidewall heat supply means for one side, the view being taken about at the section 5—5 of Fig. 2.
Figure 6:
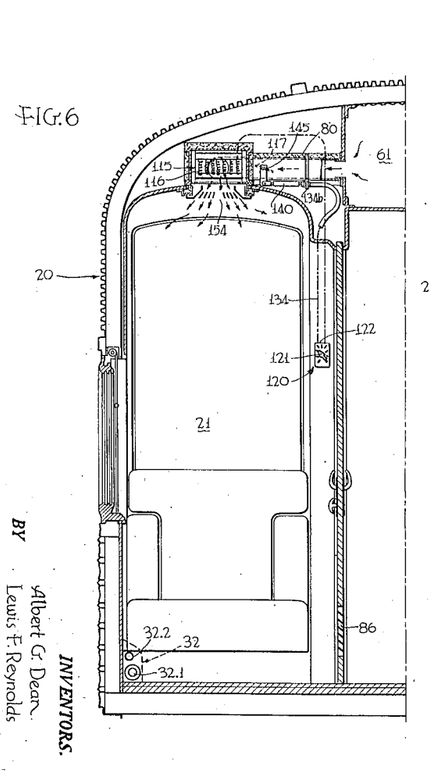
Fig. 6 is an enlarged transverse vertical section through a roomette or cabin, the view being taken about on the line 6—6 of Fig. 1.
Figure 7:
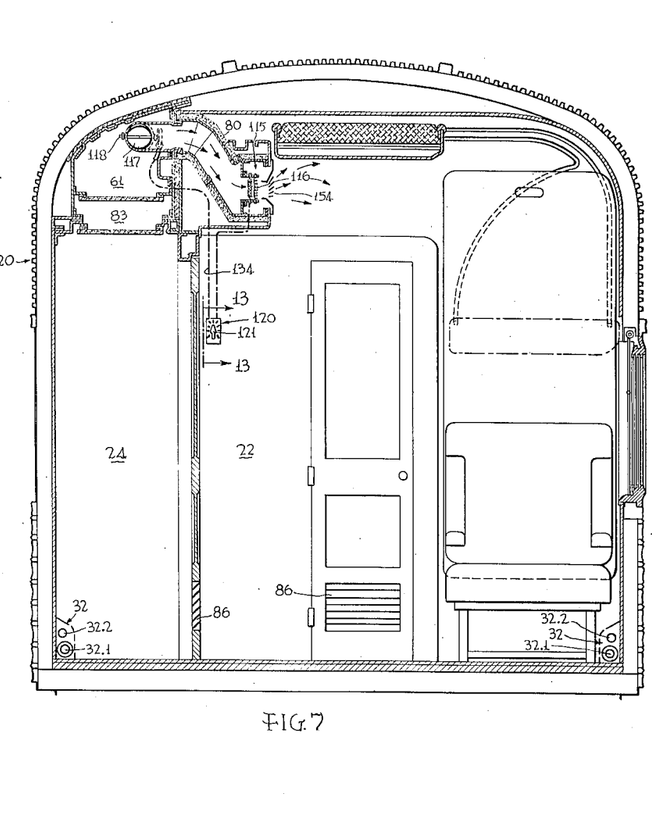
Fig. 7 is an enlarged transverse vertical section through a bedroom, the view being taken about on the line 7—7 of Figs. 1 and 3.
Figure 8:
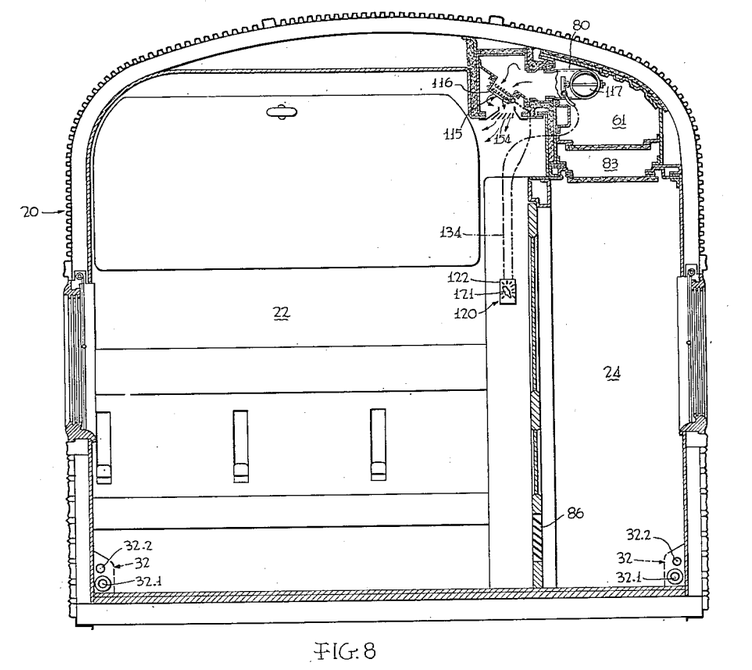
Fig. 8 is an enlarged transverse vertical section through another bedroom, the view being taken about on the line 8—8 of Figs. 1 and 3.
Figure 9:
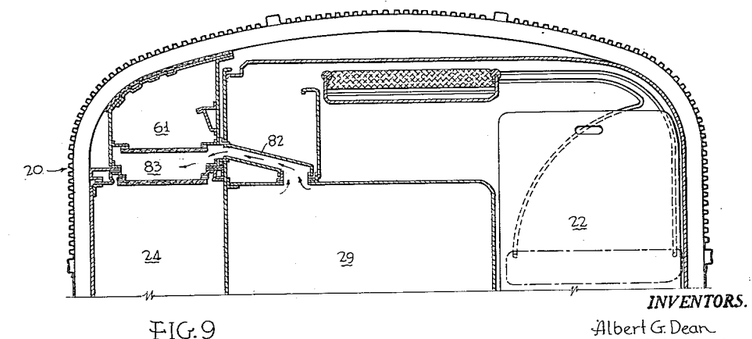
Fig. 9 is an enlarged partial transverse vertical section through a bedroom showing the air exhaust arrangement therefor, the view being taken about on the line 9—9 of Figs. 1 and 3.
Figure 10:
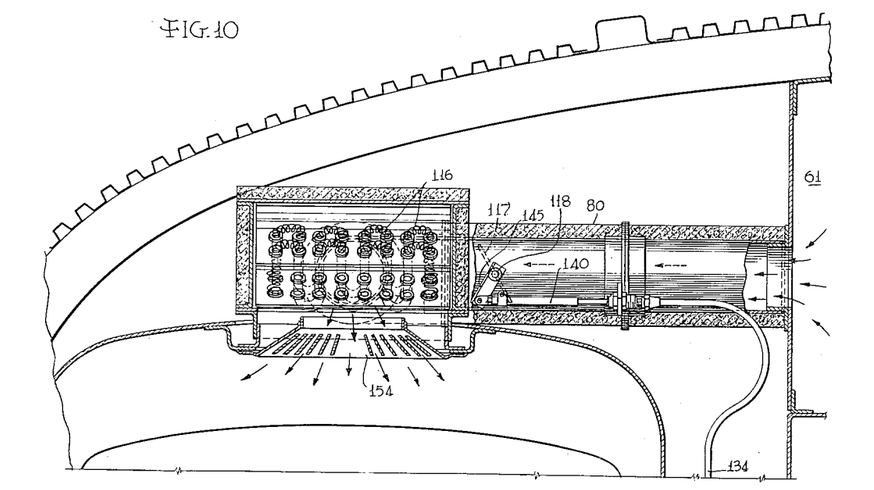
Fig. 10 is a further enlarged partial transverse vertical section showing the ventilating and supplemental thermal exchange and control means for a roomette or cabin such as is shown in Fig. 6, the view being taken about on the line 10—10 of Figs. 3 and 12.
Figure 11:
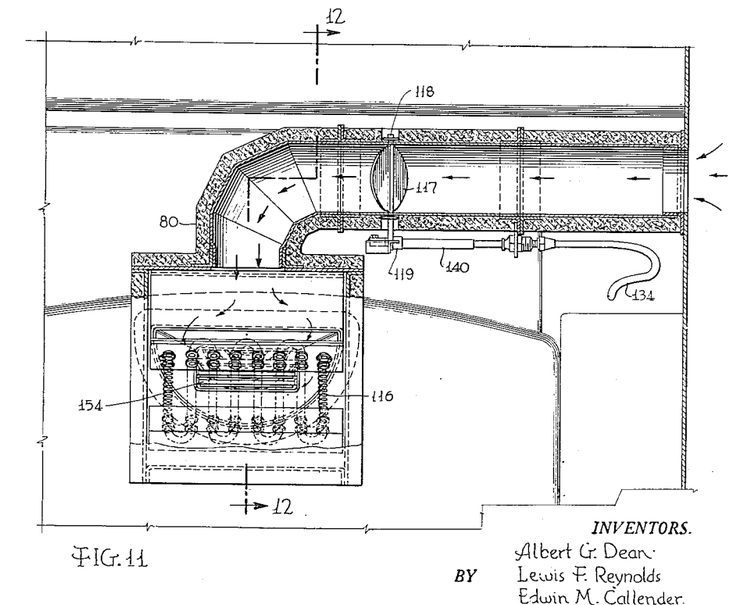
Fig. 11 is a partial transverse horizontal section taken on the line 11—11 of Fig. 12.
Figure 12:
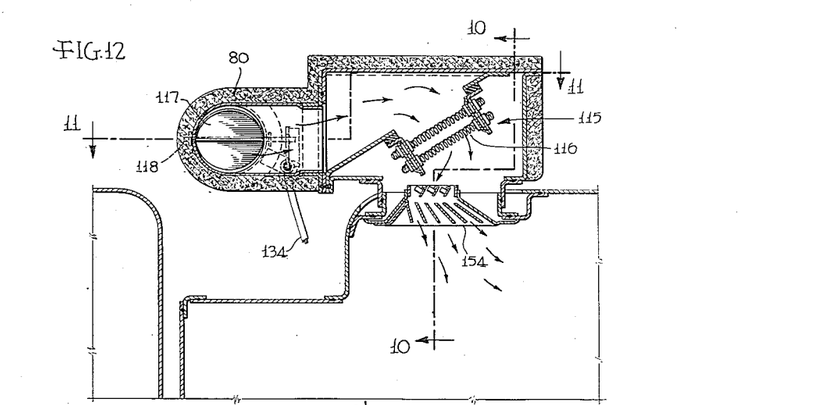
Fig. 12 is a partial longitudinal vertical section taken on the line 12—12 of Fig. 11.
Figures 13, 15:
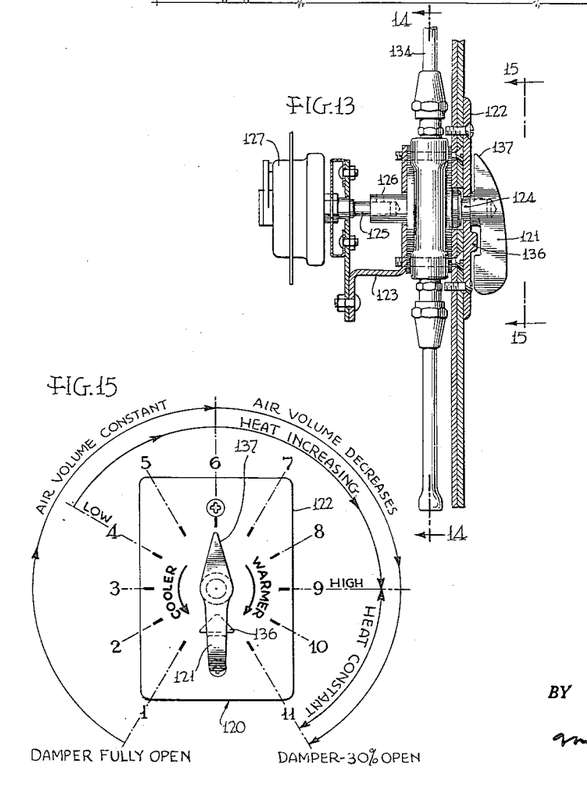
Fig. 13 is an enlarged vertical section and elevation of the control means provided in a compartment for the ventilating and supplemental thermal exchange means, the view being taken about on the line 13—13 of Fig. 7.
Fig. 15 is a vertical elevation of the control device as seen from the inside of the compartment but with explanatory illustration added, the view being taken from the line 15—15 of Fig. 13.

The tank 35 is provided with a fill pipe 39 equipped with a hand valve 40, a vent and overflow pipe 41 equipped with a pressure valve 41a and a sight glass 42, a drain pipe 43 to which the overflow pipe 41 is connected, and a system drain pipe 44 equipped with a hand valve 45 and connecting with the main drain pipe 43. Another drain pipe 44a equipped with a valve 45a is provided for the outer end of the liquid system. The pump is of the vaned centrifugal type usual in automobiles, hence when it is not running the liquid from the tank and pipes will flow freely through it to the drain pipe. The pump itself may be drained by a cock 46 at its lowest point. The pressure valve 41a is set at selected pressures, normally a few pounds per square inch, to permit the use of steam at such pressure as will assure live steam for the full length of the car without boiling the liquid in the system.

Steam is supplied to the pipe 32.3 (Figs. 2 and 4) from the train steam line 48 by way of a supply pipe 49 equipped beneath the car with a shut off and drain valve 51, a strainer 50, a pressure regulator 52, and a pressure relief valve 53. A blow down valve 50a is associated with the strainer 50.

Above the floor and associated with the sidewall heating system (Fig. 5) the steam supply pipe 49 is provided with an admission valve 54. The pipe 49 below the floor (Figs. 2 and 4) is also provided with a low pressure trap 56. A by-pass pipe 57 around the admission valve 54 is provided with a hand valve 58. In case the valve 54 fails it will fail closed but the valve 58 can be opened to supply steam for the emergency. Valve 54 is normally subject to automatic control, as will be described, but it is so made that it may be set by hand in open position. Another by-pass valve 58a in another by-pass pipe 57a is controlled by an inside thermostat 59 which causes steam to be supplied for sidewall heat when the inside temperature drops to some predetermined point, say 60° F., whether the outside thermostat calls for heat or not. The valve 58a and thermostat 59 are of the fluid actuated type so as to act without electric power during layover conditions when only steam is available. The valve closes with temperature rise, hence will fail open if the thermostat is broken thus assuring heat and safety to the car. During normal operation when electric power is available the valve 58a is kept fully closed by an electrically operated cut-out device 59a which applies fluid pressure on the valve operating means.

Pressure regulator 52 may be set for 15 p. s. i. or such other low pressure as may be desired and valve 53 may be set for a slightly higher pressure, thus assuring that only low pressure steam will reach the interior of the car.

Means are provided (Fig. 3) for supplying conditioned air to the car, the air being heated in cold weather and cooled in hot weather. The air supply and conditioning means are located in the plenum space, here at one end of the car, and conditioned air passes to the car by way of a supply duct 61. Fresh air may be drawn into the plenum chamber from outside through louvered openings 62 in the sides of the roof of the car. In the plenum chamber the fresh air mixes with return air from the car and the mixed air is blown through the supply duct 61 by motor driven blower means 63. Within the duct entrance and receiving mixed air from the blower means there are disposed a heating radiator 64 and a cooling radiator or evaporator 65. Means are provided for automatically controlling either the cooling means or the heating means in response to temperature demands after the change-over from heating to cooling or the reverse has been made by the train attendant, but only the heating means will be considered herein. The cooling means (not fully shown) is a well known and commonly used type.

Figure 3:
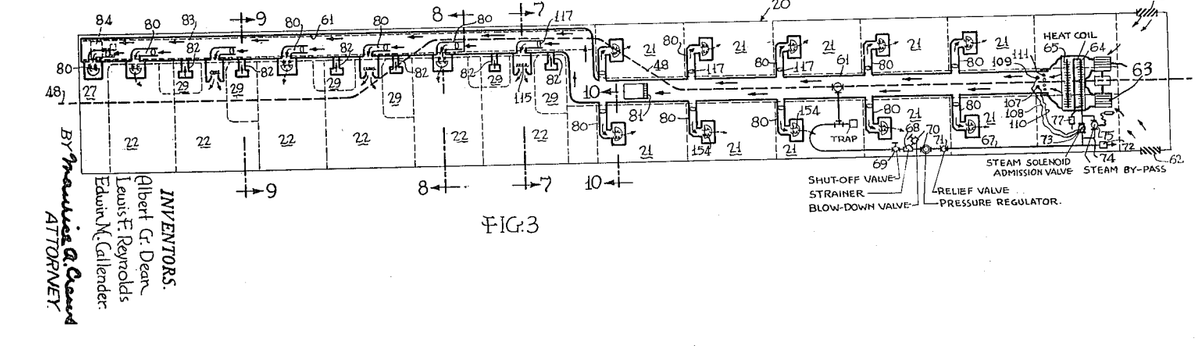
Fig. 3 is a higher plan view showing the ventilating and supplemental thermal control means associated therewith.

The heating radiator 64 is preferably heated by steam supplied from the train pipe line 48 by way of a supply pipe 67. This branch pipe 67 is provided with a shut-off and drain valve 69, a strainer 68, a pressure regulator 70, a pressure relief valve 71, a steam trap 72, a temperature regulated admission valve 73, and a by-pass pipe 74 around the valve 73 having an inside thermostat controlled valve 75. Condensate from the radiator 64 drains back to a trap 77.

The main air supply duct has branch ducts 80 extending to each compartment and at least one extending to an outlet in the aisle 27, the aisle outlet shown being at the end of the car opposite that at which the plenum chamber containing the air conditioning equipment is located. As will be seen later, each outlet is provided with a throttle valve or damper which, if many were closed at once, would cause excess pressure in the main supply duct and erratic action of those being used, so, in order to prevent the pressure in the main duct from rising too high, it is provided with a pressure relief valve 81.

Each toilet enclosure 29 of a bedroom (Figs. 3 and 9) is connected by a branch exhaust duct 82 with a main exhaust duct 83. A motorized blower 84 (Fig. 3) discharges exhaust air from the duct 83 to the outside. The cabins have no separate toilet enclosures and all of the air therefrom is discharged out the doorways 85, if the doors are open; and out of louvered openings 86 in the lower part of the doors if they are closed. The air of the bedrooms which is not removed through the toilets and exhaust duct passes into the aisle, either through the open doorways 85 or through bottom louvered openings 86 in the doors. The air returns along the aisles to the plenum chamber or to the outside through various escape openings.

Means are provided for controlling the heat delivered by the sidewall heating means and by the overhead air heating means. The sidewall heating means is made responsive to outside temperatures and supplies enough heat to make up for all heat losses at a comfort range of temperature inside without the aid of any other heating means; consequently the air heat controls may be made very simple in character and do not have to be made responsive to outside temperatures. The air in the main air supply duct 61 is furnished at a low comfort temperature and its basic heat supply is regulated according to the temperature of the air as delivered to the main supply duct. At each compartment simple and effective means are provided for lessening the temperature reducing effects produced by the overhead air.

This enables the occupant to raise his room temperature from a minimum up to or above the temperature which would be maintained by the basic sidewall heating means alone.

Considering first the thermal controls for the sidewall heating means (Fig. 5), there is provided an outside thermostat 90 which acts through a fluid-pressure switch device 92 by way of a capillary fluid tube 93 to control the operation of the motor of pump 34. An electrical cable 94 connects the switch device 92 with the motor of the pump. It may be arranged that when the outside temperature drops to 50° F. the pump will be started. It will continue to operate at all lower temperatures. At this and colder outside temperatures the water will be heated.

A similar outside thermostat 95 acts through a capillary tube 96 to impose its effect upon a temperature control device 97. Another thermostat 98 immersed in the liquid in tank 35 is connected by a capillary tube 99 with the switch device 97 and exerts its influence thereon. The device 97 may be referred to as a differential temperature switch device. It is connected by a cable 100 with the solenoid 101 of the steam admission valve 54.

By this arrangement there is a mutual and complementary effect produced by outside temperature and water temperature which requires progressively higher water temperature as the outside temperatures decrease. When the outside or the water temperature falls, steam will be admitted by the valve 54 to heat the water. For example, for one installation, when the outside temperature is 50° F., the water temperature is 115° F.; when the outside temperature is 35° F. the water temperature is 130° F.; when the outside temperature is 20° F. the water temperature is 147° F.; when the outside temperature is 5° F. the water temperature is 163° F.; when the outside temperature is −10° F. the water temperature is 178° F.; and when the outside temperature is −30° F. the water temperature is 200° F. The water temperature may be carried as much higher as desired in keeping with the pressure relief point in the tank. It is desirable to avoid boiling of the water.

The water temperatures for various outside temperatures are selected by test for each type of car so as to keep it at an approximately constant temperature within the comfort range for all outside temperatures. The temperatures of liquid required will, of course, depend upon the various characteristics of the car, such as type of covering, type of insulation, size of pipes, speed of water circulation, effect of radiation fins, amount of steam pressure, and the like. Then, for the different compartments of compartment cars the basic temperature maintained by the sidewall heat alone can be adjusted by design or selection of the surface area and net effectiveness of the fin radiation used.

Figure 20:
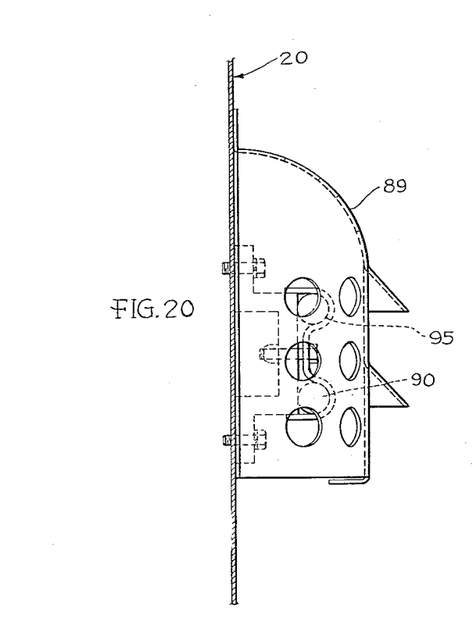
Fig. 20 is a vertical section through a protective housing for an outside thermostat.

The outside thermostats 90 and 95 are intended to register as accurately as possible the temperature of the outside surface of the outer covering or skin sheet of the car and for this purpose (Fig. 20) may be mounted in an outside housing 89 which provides mechanical protection but which causes weather conditions of wind, rain, sun, snow, etc. to be maintained which substantially duplicate those of the skin sheet surface. Indeed, the thermostats are directly connected by thermally conductive means to the surface of the skin sheet so as to assume as far as possible the exact temperature of this outer surface.

The means provided for controlling the temperature of air in the main air supply duct (Fig. 3) includes a first thermostat 107 connected by a line 108 to the actuating element of steam admission valve 73 and a second thermostat 109 connected to the same valve by a line 110. The first thermostat may be set at 60° F. and the second at 68° F. The second causes an increase of initial overhead air temperature in case of a low voltage condition of the car battery system, as will be explained later herein. Cooling control thermostats located in the space for return air, are collectively indicated at 111.

The normal supply of air at 60° F. reduces the temperature of the compartments which would be produced by the sidewall heating means alone, from a high comfort range to a low comfort range. A low comfort range may satisfy some occupants but others may need higher temperatures for comfort. Means are herein provided for giving the occupant personal and immediately effective control of the thermal changing effects of the air supplied to his compartment. These means herein take the form of a manual control device which by stages reduces the temperature reducing effect of the air supplied. Specifically this is effected by changing the amount of air supplied or changing the heat content of the air as supplied, or both.

Figure 19:
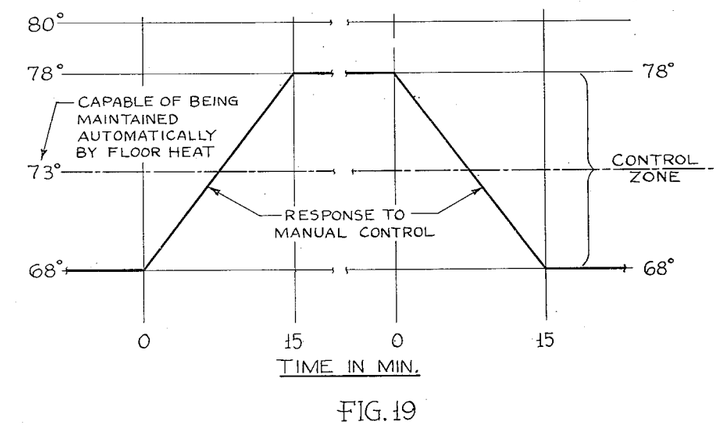
Fig. 19 is a diagram showing the relationship of the function of the supplemental thermal exchange means to the function of the basic thermal exchange means.

Referring to the diagram of Fig. 19, the sidewall heat alone will maintain the temperature of the compartment within a comfort range or zone, say from 68° F. to 78° F. Preferably the basic temperature will be at a higher comfort level, say about 73° F. Then with air supplied at 60° F. the occupant can maintain a lower comfort temperature, say 68° F., by allowing the maximum permissible volume of air to be supplied without adding supplemental heat to it, as by the booster heater provided for this purpose. If he desires higher temperatures he moves the control to first add heat to the air without materially changing its volume, then to add heat and concurrently reduce the volume of air, and finally to reduce the volume of air further while maintaining the heat constant at its highest amount. In this way he may raise the temperature of his compartment to a higher comfort level, say 78° F. With the predominant steady sidewall heat always maintained within the comfort range, with air supplied at a basic temperature near or within this range, and with his individual controls, the compartment occupant can quickly change his compartment temperature to selected points within the comfort range but can never shift the temperature out of this range. The most satisfactory arrangement appears to be to set the basic temperature at a median point, say 73° F. as shown in Fig. 19, and to shift the compartment temperature about this median, below or above, as the occupant may desire. Then if the occupant's controls fail or even if the air supply temporarily fails no occupant will be too warm.

Coming now to the specific control means provided at each compartment (Figs. 3, 4, 6, 7, 8 and 10–17), the branch air supply duct 80 to each compartment is provided near its discharge end with a booster heating unit 115, here in the form of an electrical resistance heating coil 116. In each branch duct there is also disposed an air throttling damper 117 having a blade or plate hinged to turn about a shaft or axis 118 and having an external arm operated by a reciprocating element 119.

The supply of current to the heating coil 116 and the operation of the damper 117 are conjointly controlled in each compartment by a hand control device generally indicated by the reference numeral 120.

The control device 120 (Figs. 13, 14 and 15) comprises a handle 121 having a pointer movable over a dial plate 122 mounted on a frame 123 secured to the wall. The handle is secured to a shaft 124 carried by the frame 123. The shaft may have an extension 125 connected by a sleeve coupling 126 for operating a rheostat 127. The shaft 124 carries fast thereon a peripherally grooved and notched disk or pulley 130 which engages the outer surface of a push-pull wire 133 slidably carried and closely embraced by a tube or sheath 134. The push-pull wire, preferably, is adapted to operate smoothly around sharp bends and a commercially known product which comprises a multiple strand spirally wound element known as "Teleflex" cable has been found to be very satisfactory. The sheath may simply comprise a copper tube cut to lengths and connected by usual fittings. A stop 136 on the face plate 122 cooperates with the pointer end or lug 137 on the handle 121 to limit the movement in extreme positions. The body of the handle on the under side (Fig. 13) is cut away to pass over the stop 136.

Figure 14:
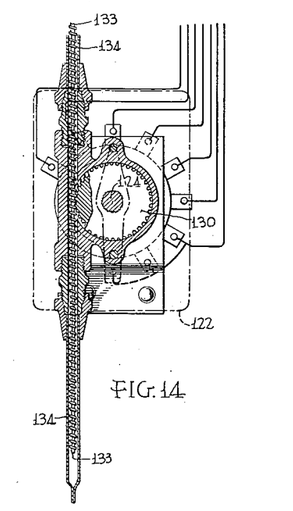
Fig. 14 is a vertical section taken on the line 14—14 of Fig. 13.
Figures 16, 17:
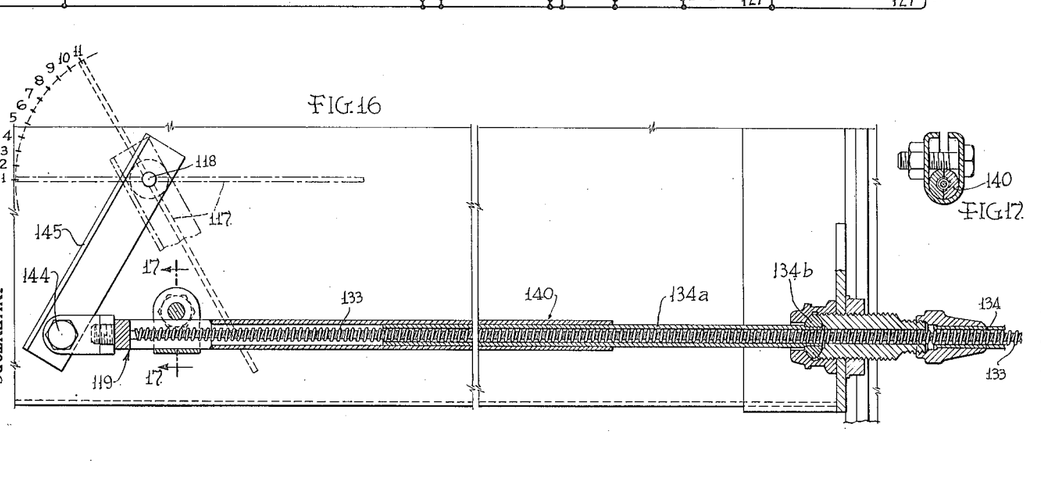
Fig. 16 is a longitudinal section through the damper operating mechanism.
Fig. 17 is a transverse section taken on the line 17—17 of Fig. 16.
Figure 18:
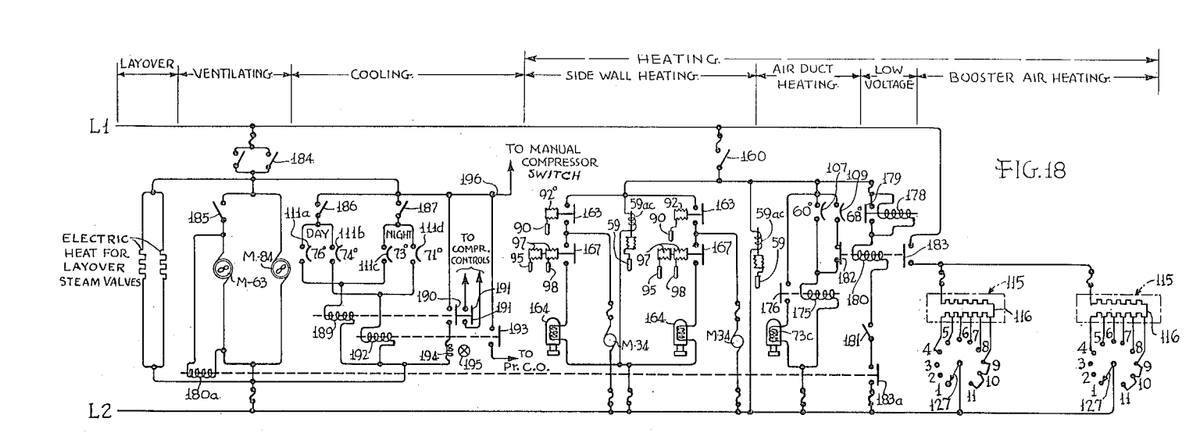
Fig. 18 is a wiring diagram.

Electrical conductors extend from the rheostat contacts to the heater coil 116 in the branch duct. The tube 134 and the operating wire 133 extend toward the damper operator 119. As indicated (Fig. 15) by the diagram shown around the control handle 121, the rheostat contact arm is operated from the beginning of the turning movement of the handle from the extreme left or 7 o'clock position but no connection is made for the first few handle positions. The heating element is first connected at the No. 4 or 10 o'clock position and prior to this the air damper has been closing from the initial or No. 1 position where it admits 100% air volume to the No. 4 position where, due to its inherent nature, it begins to have a slight effect in changing the volume of air admitted. When the damper is moved a small amount from its position parallel with the axis of the duct (the No. 1 position shown in dot-and-dash lines in Fig. 16) it reduces the space for air passage but does not greatly reduce the volume of air passing it, merely causing an increase in the speed of air flow past the damper. The damper begins to be materially effective in reducing the volume of air delivered at the middle or 12 o'clock position, which is the normal point on which the control is set by the train attendants. If the damper does not inherently supply substantially the maximum volume of air below this point the control mechanism will be provided with a slack-motion element as shown in the parent application. The application of available heat energy through the booster heater is increased in successive steps from the No. 4 or 10 o'clock position to the No. 9 or 3 o'clock position and thereafter is kept constant at the maximum amount. The last three contacts are bridged by a bus, as shown in Figs. 14 and 18. The damper continues to close and reduce the volume of air to the No. 11 or 5 o'clock position where it admits about 30% of the maximum volume of air.

As a practical matter, when electrical power on a car is available, the pointer of the hand control handle 121 is normally set in a median position, here shown as the No. 6 or 12 o'clock position, where the damper is partly closed and only slightly effective and where some booster heat is supplied. This will satisfy average personal comfort preferences, the temperature maintained being very close to the basic sidewall-maintained temperature, say near 73° F. If this is too warm for the occupant he moves the pointer to the left to "Cooler" to reduce and finally cut off the booster heat, the volume of air delivered being maintained near maximum; and if it is too cool he moves the pointer to the right to "Warmer" to add more booster heat and reduce the volume of air delivered, and finally to further reduce the air volume without further addition of heat.

The same compartment control 120 may be used in the cooling season as well as in the heating season. The electrical heating unit may be cut out because the air cooling equipment places heavy demands on the electrical supply system, but the damper will always be available for controlling the volume of air supplied. When electric energy is available for the booster heater, it will be useful for reheating the chilled air to remove all feeling of dampness.

At its upper end the push-pull wire 133 is secured to a slide bar 140 (Figs. 10, 11 and 16) which is connected, as by a pin 144 with the operating arm 145 secured on the damper shaft. The slide bar is tubular and has a sleeve surrounding the outer end of a tube extension 134a which, at a fixed anchorage joint 134b, is provided with a swingable joint, such as a ball joint, to allow the parts at the outer end to swing in the arc of movement of the pin 144 connecting the push-pull element to the damper operating arm 145.

The outlet of each branch duct 80 is provided with an air spreading device 154 and this may also serve to mix incoming air with compartment air. The type shown, known as an "Anemostat," mixes air in the compartment very effectively and produces such circulation, though without noticeable drafts, as to make the sidewall heating means more effective for heating the air in the compartment.

The system and its operation will be better understood from an explanation of the wiring diagram shown in Fig. 18. Train current, obtained from the generator-battery installation on each car, is supplied by power lines L1, L2 to both the heating and cooling portions of the circuit. These are indicated by the legends "Heating" and "Cooling."

Hand switch 160 serves to place the heating system in circuit. This supplies current to one contact each of switches 163, one for each side of the car, operated by the pressure device 92 from the outside thermostat 90. As previously explained, this thermostat 90 functions at some predetermined outside temperature, say 50° F., to close the switch 163 to operate the motor M–34 of the pump 34 to cause water to circulate.

The differential pressure device 97, which is responsive jointly to the outside thermostat 95 and the liquid thermostat 98 (one on each side), operates, when the temperature conditions require, to close a switch 167 and energize the solenoid coil 164 of the solenoid device 101 of steam admission valve 54 to admit steam for heating the liquid in the sidewall liquid pipes.

For stand-by conditions, when the electric current is off, the coil 59ac for the cut-out device 59a of the pressure actuated by-pass valve 58a is deenergized to take pressure off the valve 58a and allow it to be operated by the thermostat 59.

The controls for the overhead duct air heating means comprise a first duct thermostat switch 107 for normal operation which closes, as previously noted, at some predetermined temperature say, 60° F. When it closes it energizes a relay 175 to close its switch 176 and energize the solenoid coil 73c, causing the steam admission valve 73 to open.

Mention has been made of means to cut out the booster heaters 115 for the branch ducts and increase the temperature of the air supplied to the main duct when the car (or train) voltage is low, thus conserving the energy of the batteries for lighting and other normal functions. The means herein provided comprises a low voltage relay 178 which, at a predetermined low voltage limit on the lines L1, L2, becomes de-energized and allows its normally closed switch 179 to open. This de-energizes a relay 180 to close its switch 182 and open its switch 183. An emergency hand switch 181 in the line of relay 180 is normally closed.

Closure of switch 182 puts current on the shunt conductor leading to a high temperature thermostat 109 which closes at a drop to some predetermined temperature, say 68° F. This energizes relay 175 and closes its switch 176 to open steam valve 73 without regard to the action of the low temperature thermostat 107. If air is heated to the higher temperature, as is intended, when the thermostat switch 109 closes at 68° F., the thermostat 107 will not close at all; but if switch 109 does not close, switch 107 will close when the inside temperature drops low enough.

Opening of switch 183 cuts off current from all of the booster heater circuits, including the booster heater coils 116 and their rheostat switches 127. When normal voltage is restored, normal operation of the booster heaters is resumed. For an emergency, hand switch 181 is opened with the same effect as that caused by the low-voltage de-energization of relay 178.

Means are provided for preventing the booster heaters 115 from receiving electric current when the blower 63 is not operating to supply air over the heating coils, thus avoiding the possibility of the coils overheating when the volume of air passing over them is insufficient. As an example of such means, the line to the blower motor M–63 is provided with a relay coil 180a which controls a switch 183a in the line to the relay 180 of the booster heater coil control. The switch might also be kept closed by a pressure device located in the main air duct or by a device responsive to the mechanical operation of the blower itself.

Part of the cooling circuit is shown and will be described in order to give a more complete understanding of the over-all system, although the cooling means itself is not a part of the present invention.

A double-bladed hand switch 184 places the cooling circuit on the lines L1, L2. This sets the motor M–84 of exhaust fan 84 into operation. As has been noted, this exhaust fan may operate during heating periods as well as during cooling periods. The motor M–63 of blower fan 63 in the main air duct is operated when switch 184 is closed, an emergency switch 185 being assumed to be normally closed.

Hand switches 186 and 187 are provided for day and night operation respectively and if both are open the cooling means will not operate at all. Thermostats 111a, 111b, which close on a rise to say 76° F. and 74° F., respectively, are arranged in series with day switch 186; and thermostats 111c and 111d, which close on a rise to say 73° F. and 71° F., respectively, are arranged in series with night switch 187. Thermostat switches 111a and 111c are arranged in parallel to operate a relay 189 which operates switches 190 and 191; and thermostat switches 111b and 111d are arranged in parallel to operate a relay 192 to operate a switch 193. Switch 190, when closed, energizes a solenoid coil 194 which closes a refrigerant supply valve 195. Switch 191, when closed, starts the refrigerant compressor. Switch 193, when closed, operates a refrigerant pressure limiting device. A branch conductor 196 leads to a manual refrigerant compressor switch. This cooling system, as stated, is well known and need not be described further.

The above description has been directed largely to plural compartment vehicles, but the invention in certain phases applies as well to other vehicles, such, for example, as coaches, which have a main large compartment and small accessory compartments, such as wash rooms, which are occupied only transiently. These accessory compartments may be heated by common sidewall and air heat exactly like the large compartment, or, if desired, they may be provided with booster air heaters, as described above for the full-time occupancy compartments. Even zones in the coach might be separately subject to booster heat and air volume control. In the the coaches the overhead air is preferably heated to a higher temperature than for the compartment cars or sleepers, say 74° F. for day and 76° F. for night, as compared to 60° F. for day and night for sleepers; and in this case the low voltage device needs only to cut out the heating coils of the booster heaters and need not change the temperature of the air supplied to the main overhead air duct. That is, the switch 182 of Fig. 18 may be omitted for the coaches, although it can be used if desired. On the cooling side, there may be a shift from the cooler day temperature to less cool night temperature. This is the opposite of what was done for the sleepers for there it is assumed that the occupants will be covered by bedclothes, whereas in a coach there is no additional clothing and the passengers are less active at night than during the day. Otherwise, the systems for sleepers and coaches are about the same.

In operation, the sidewall heating means provides a moderate full-length temperature which is substantially uniform from one end of the car to the other. The constant circulation of liquid by the pump together with the full-length arrangement of the steam pipes within the water pipes provides this uniformity of temperature. The heat, however, is not sufficient to make the occupants uncomfortable, nor is it intermittently over-hot and over-cold, as is so common when steam alone is used for heating. As the temperature outside gets colder the liquid is automatically heated to higher temperatures, the sidewall heat alone approximately compensating for all heat losses through the outer walls or shell at a high comfort temperature within the car until sub-zero temperatures are reached. By high comfort temperature is meant a temperature above the minimum comfort temperature, as shown in Fig. 19. This not only satisfies the average occupant preference but permits a swing about the basic comfort temperature, as by the compartment controls, to allow those who desire cooler or warmer comfort temperatures to readily achieve their preferences by effects produced with and by the air supplied at a low comfort temperature. The sidewall heating liquid has great thermal inertia and maintains a uniform temperature, both as to time and space, whereas the air has low thermal inertia and may have its effects changed almost instantly, especially when supplied at an initial temperature which lies near enough to the basic temperature maintained by the sidewall heating means to permit the temperature to be shifted readily in the compartment by relatively small thermal exchange imposed upon the air.

In the example given, Fig. 19, the sidewall heat may be set at 73° F., the overhead air delivered at 60° F., and the room control set to give the occupant a range of 68° F. to 78° F. The air alone, even if all sidewall heat should be cut off would be adequate to maintain a slightly lower than minimum temperature but still bearable and well above freezing.

Assuming that the booster heat control handle is set in the median position, No. 6, the compartment temperature will be near that set by the sidewall heating means, about 73° F., and will satisfy the preference of the majority of occupants. This supplies substantially the full maximum volume of air and two stages of booster heat. If the room occupant desires a cooler temperature he turns the handle to the left to reduce the heat, the volume of air supplied remaining about the same or increasing slightly as the valve moves to the fully open position. If he desires warmer temperatures, he moves the handle to the right. This adds booster heat and reduces the air volume, then stabilizes the booster heat at its maximum amount, and thereafter further reduces the volume of air. The less the amount of air to be heated the higher will be its temperature and the more rapid its effect upon the room temperature. This increase in room temperature is largely due to the fact that less air is forced out of the room, allowing an accumulation of the hotter air supplied to the room. In no case, however, can the amount of air be reduced below a predetermined minimum selected for freshness and health. It is to be noted that movement of the control handle gives the same type of response whether the booster heat is on or off, the volume of air delivered being changed in either case over a certain range of movement of the control. When the booster heat is cut off, the degree of temperature change for a given movement of the handle is merely less than when it is on.

What the occupant of a single compartment or even the occupants of several compartments may do will not change the overall situation or render ineffective the controls of other occupants. This is true because each compartment acts like one of a plurality of parallel ducts and whatever heat is supplied to the air entering it and in it must leave with the air flowing out of it, the sidewall heat largely taking care of heat loss to the outside. If this air flows back to the plenum chamber, it cannot change the prevailing situation there because there is always enough fresh air entering from outside, never under 50%, to provide the minimum temperature (60% F.) for air passed to the main air duct, and since this air temperature is controlled to enter the main air supply duct at a selected point, the situation presented at the branch ducts to the compartments is always the same within narrow limits. Consequently, the selective control means for each compartment is always fully and rapidly effective.

If there is much drain on the electrical system of the car, the voltage will drop and the booster heaters will be disconnected but the overhead air temperature will be automatically increased to provide a higher than minimum comfort temperature, say 68° F.

Hand valves and switches are provided in sufficient number to take care of failures of automatic instruments and to select the desired stand-by or non-occupancy conditions when it is desired merely to safeguard the car installation against freezing. The overhead air heat need not be used at all for stand-by conditions, the sidewall heat being made adequate to make the car and its equipment safe down to the lowest expected outside temperatures.

It is thus seen that by very simple and inexpensive apparatus the new system provides for all heating (and cooling) requirements; that each occupant of a compartment is provided with means for selecting the temperature which best suits him; and that the temperature change or response will be sufficiently rapid to enable the occupant to feel at once that the control changes have produced the desired effects. There is a minimum of equipment to get out of order and most of the controls can be repaired or replaced while the car is travelling.

While one embodiment of the invention has been described to illustrate the principles of the invention, it is to be understood that there may be various embodiments within the general scope of the invention.

What is claimed is:

1. The method of thermally conditioning and ventilating an enclosure comprising the following steps: supplying within the enclosure through a liquid thermal exchange medium a variable quantity of thermal exchange units in response conjointly to variable outside temperatures and to the temperature of the liquid to compensate for all shell thermal exchange with the outside air and maintain the inside temperature within a predetermined comfort range, and supplying at the same time within the enclosure a ventilating medium at a temperature closely approximating the existing comfort temperature established by the thermal exchange medium, whereby the temperature established by the thermal exchange medium is not greatly changed by said ventilating medium and whereby the thermal exchange energy input to the ventilating medium may be held to a minimum.

2. The method of thermally conditioning and ventilating an enclosure comprising the following steps: supplying within the enclosure through a principal liquid thermal exchange medium of slow thermal exchange rate and of great thermal inertia, a variable quantity of thermal exchange units in response conjointly to variable outside temperatures and to the temperature of the liquid to compensate for all shell thermal exchange with the outside air and maintain the inside temperature within a predetermined comfort range, and supplying at the same time within the enclosure a ventilating medium of low thermal inertia at a temperature closely approximating the existing temperature established by the principal thermal exchange medium, whereby the temperature established by the principal thermal exchange medium is not greatly changed by said ventilating medium and whereby the thermal exchange energy input to the ventilating medium may be held to a minimum.

3. The method of thermally conditioning and ventilating a narrow elongated enclosure such as a railway passenger car or the like comprising the following steps: supplying within the enclosure along the full length of each long side through a liquid thermal exchange medium of substantially uniform temperature throughout the length of the enclosure, a variable quantity of thermal exchange units in response conjointly to variable outside temperatures and the temperature of the liquid thermal exchange medium to compensate for all shell thermal exchange with the outside air and maintain the inside temperature of the enclosure within a predetermined comfort range, and supplying at the same time within the enclosure, air at a temperature closely approximating the existing temperature established by the liquid thermal exchange medium.

4. The method of thermally conditioning and ventilating an enclosure comprising the following steps: supplying within the enclosure through a principal liquid thermal exchange medium a variable quantity of thermal exchange units in response conjointly to variable outside temperatures and to the temperature of the liquid to compensate for all shell thermal exchange with the outside air and maintain the inside temperature within a predetermined comfort range, supplying at the same time within the enclosure a ventilating medium at a temperature closely approximating the existing temperature established by the principal thermal exchange medium, and selectively altering the quantity of thermal exchange units produced by the ventilating medium as delivered to different zones within the enclosure to suit local requirements of each zone.

5. The method of thermally conditioning and ventilating an enclosure comprising the following steps: supplying within the enclosure through a principal liquid thermal exchange medium a variable quantity of thermal exchange units in response conjointly to variable outside temperatures and to the temperature of the liquid to compensate for all shell thermal exchange with the outside air and maintain the inside temperature within a predetermined comfort range, supplying at the same time within the enclosure a ventilating medium at a temperature below but closely approximating the existing temperature established by the principal thermal exchange medium, and selectively altering the quantity of thermal exchange units produced by the ventilating medium as delivered to different zones within the enclosure to vary the temperature of each zone to suit local requirements.

6. The method of thermally conditioning and ventilating an enclosure comprising the following steps: supplying within the enclosure through a principal liquid thermal exchange medium a variable quantity of thermal exchange units in response conjointly to variable outside temperatures and to the temperature of the liquid to compensate for all shell thermal exchange with the outside air and maintain the inside temperature within a predetermined comfort range and above the lower limit of the comfort range, supplying at the same time within the enclosure a ventilating medium at a temperature below the existing temperature established by the principal thermal exchange medium but within the comfort range, and selectively altering the quantity of thermal exchange units produced by the ventilating medium by one of the factors of changing the thermal content or volume of medium as delivered, or both, to vary the temperature of each zone to suit local requirements.

7. Thermal conditioning and ventilating means for an enclosure comprising in combination, principal thermal exchange means within the enclosure, control means for said principal thermal exchange means responsive to outside temperature conditions for supplying through said principal thermal exchange means sufficient energy to alone maintain the inside temperature within a comfort range for all outside temperatures, means to supply ventilating air to said enclosure, means for altering the temperature of the air, and control means responsive to the temperature of the air supplied inside the enclosure for regulating the action of the air temperature altering means for causing the air to be supplied at a temperature near that established within the enclosure by said principal thermal exchange means.

8. Thermal conditioning and ventilating means for a multi-compartment enclosure comprising in combination, principal thermal exchange means responsive to outside temperatures to maintain a temperature throughout the enclosure within a comfort range, means for supplying air to the enclosure at a temperature near that established by the principal thermal exchange means, and means for each compartment for altering the thermal exchange effect produced by the air entering the compartment to alter the temperature of the compartment within the predetermined range of comfort temperatures.

9. Thermal conditioning and ventilating means for a multi-compartment enclosure comprising in combination, principal thermal exchange means responsive to outside temperatures to maintain a temperature throughout the enclosure within a predetermined comfort range, means for supplying air to the enclosure at a temperature near but below that established by the principal thermal exchange means, and means for each compartment for altering the thermal exchange effect produced by the air entering the compartment to alter the temperature of the compartment within the predetermined range of comfort temperatures.

10. Thermal conditioning and ventilating means for a multi-compartment enclosure comprising in combination, principal thermal exchange means responsive to outside temperatures to maintain a temperature throughout the enclosure within a predetermined comfort range, means for supplying air to the enclosure at a temperature near but below that established by the principal thermal exchange means, and means for each compartment for altering the thermal exchange effect produced by the air entering the compartment by means for changing its volume and means for changing its thermal content as delivered or one of these means, to alter the temperature of the compartment within the predetermined range of comfort temperature.

11. Thermal conditioning and ventilating means as set forth in claim 10, which further includes a single control means for conjointly controlling the means for changing the volume and the means for changing the thermal content of air delivered to a compartment.

12. A vehicle heating and ventilating system comprising in combination, a liquid heat exchange conduit means extending the full length of the vehicle space to be heated, a steam heat exchange conduit means extending through the liquid heat exchange conduit means for the full length of the vehicle, means for circulating liquid in the liquid conduit means, means responsive to outside temperatures for causing circulation of liquid at all temperatures below a predetermined temperature, means responsive to outside temperature and liquid temperature for controlling the supply of steam to said steam conduit means, means for supplying air to said vehicle, means for heating the air supplied, and means controlled by the temperature of the heated air for controlling the supply of heat by said air heating means.

13. A vehicle heating and ventilating system comprising in combination, a liquid heat exchange conduit means extending the full length of the vehicle space to be heated, a steam heat exchange conduit means extending through the liquid heat exchange conduit means for the full heating length of the vehicle, means for circulating liquid in the liquid conduit means, means responsive to outside temperatures for causing circulation of liquid at all temperatures below a predetermined temperature, means responsive to outside temperature and liquid temperature for controlling the supply of steam to said steam conduit means, means for supplying air to said vehicle, means for heating the air supplied, and means controlled by the temperature of the heated air for controlling the supply of heat by said air heating means, said fluid heating means and controls being separate and independent for each side of the vehicle, and said air supply means being common for the entire vehicle.

14. A vehicle heating and ventilating system comprising in combination, a liquid-steam concentric conduit sidewall heating system extending the full length of the vehicle space to be heated on each side, means for regulating the admission of steam to the sidewall heating system in accordance with outside temperature, means for supplying heated air to the vehicle, a plurality of compartments in the vehicle, a branch air supply duct to each compartment, and means in each compartment for varying the heat input of the air to the compartment.

15. A vehicle heating and ventilating system comprising in combination, a liquid-steam concentric conduit sidewall heating system extending the full length of the vehicle space to be heated on each side, means for regulating the admission of steam to the sidewall heating system in accordance with outside temperature, means for supplying heated air to the vehicle, a plurality of compartments in the vehicle, a branch air supply duct to each compartment and means in each compartment for varying the heat input of the air to the compartment, said heat varying means including a control device for varying the air volume alone at times, varying the heat content of the air at times, and varying both the air volume and its heat content simultaneously at times.

References Cited in the file of this patent
UNITED STATES PATENTS

| | | |
|---|---|---|
| 384,452 | Leland | June 12, 1888 |
| 1,404,901 | Schreiber | Jan. 31, 1922 |
| 2,072,166 | Goodman | Mar. 2, 1937 |
| 2,154,801 | Anderson et al. | Apr. 18, 1939 |
| 2,234,288 | Smith | Mar. 11, 1941 |
| 2,240,731 | Van Vulpen | May 6, 1941 |
| 2,271,158 | Browne | Jan. 27, 1942 |
| 2,534,148 | Russell et al. | Dec. 12, 1950 |
| 2,613,919 | Russell et al. | Oct. 14, 1952 |
| 2,617,598 | Sanders | Nov. 11, 1952 |
| 2,637,500 | Kessler | May 5, 1953 |